(12) United States Patent
Petruchik

(10) Patent No.: US 6,902,454 B1
(45) Date of Patent: Jun. 7, 2005

(54) PROCESS FOR LAMINATING ELECTRICALLY ADDRESSABLE DISPLAY

(75) Inventor: Dwight J. Petruchik, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 672 days.

(21) Appl. No.: 09/627,802

(22) Filed: Jul. 28, 2000

(51) Int. Cl.$^7$ .................................................. H01J 9/26
(52) U.S. Cl. ............................................ 445/24; 445/25
(58) Field of Search .................... 445/25, 24; 313/512, 313/511; 362/559–561; 156/308.2, 309.6, 320, 322; 428/1; 359/80

(56) References Cited

U.S. PATENT DOCUMENTS

| | | | | |
|---|---|---|---|---|
| 3,816,789 A | * | 6/1974 | Sawagata et al. | 313/243 |
| 4,023,259 A | * | 5/1977 | Kubota et al. | 29/592.1 |
| 4,060,654 A | * | 11/1977 | Quenneville | 374/162 |
| 4,310,577 A | * | 1/1982 | Davison et al. | 428/1.61 |
| 4,422,732 A | * | 12/1983 | Ditzik | 359/315 |
| 4,435,047 A | | 3/1984 | Fergason | |
| 4,526,818 A | * | 7/1985 | Hoshikawa et al. | 428/1.5 |
| 4,685,771 A | | 8/1987 | West et al. | |
| 4,721,883 A | * | 1/1988 | Jacobs et al. | 313/505 |
| 5,055,662 A | * | 10/1991 | Hasegawa | 235/492 |
| 5,085,605 A | * | 2/1992 | Itani et al. | 445/25 |
| 5,116,528 A | | 5/1992 | Mullen et al. | |
| 5,137,484 A | * | 8/1992 | Bohannon | 445/25 |
| 5,142,391 A | * | 8/1992 | Fujiwara et al. | 349/27 |
| 5,184,969 A | * | 2/1993 | Sharpless et al. | 445/24 |
| 5,266,865 A | * | 11/1993 | Haizumi et al. | 313/506 |
| 5,365,356 A | * | 11/1994 | McFadden | 349/187 |
| 5,437,811 A | | 8/1995 | Doane et al. | |
| 5,583,670 A | | 12/1996 | Iijima et al. | |
| 5,766,694 A | * | 6/1998 | West et al. | 427/510 |
| 5,767,931 A | * | 6/1998 | Paczkowski | 349/158 |
| 5,830,028 A | * | 11/1998 | Zovko et al. | 446/15 |
| 5,838,409 A | * | 11/1998 | Tomono et al. | 349/122 |
| 5,854,664 A | * | 12/1998 | Inoue et al. | 349/92 |
| 5,868,892 A | * | 2/1999 | Klima, Jr. | 156/267 |
| 5,872,608 A | * | 2/1999 | Inoue et al. | 349/86 |
| 5,942,066 A | * | 8/1999 | Sunaga et al. | 156/102 |
| 5,978,065 A | * | 11/1999 | Kawasumi et al. | 349/188 |
| 6,002,383 A | * | 12/1999 | Shimada | 345/87 |
| 6,036,568 A | * | 3/2000 | Murouchi et al. | 445/25 |
| 6,052,137 A | * | 4/2000 | Shimada | 347/171 |
| 6,211,938 B1 | * | 4/2001 | Mori | 349/190 |
| 6,275,277 B1 | * | 8/2001 | Walker et al. | 349/113 |
| 6,330,099 B1 | * | 12/2001 | Sojourner et al. | 359/254 |
| 6,556,260 B1 | * | 4/2003 | Itou et al. | 349/69 |

* cited by examiner

*Primary Examiner*—Joseph Williams
*Assistant Examiner*—Dalei Dong
(74) *Attorney, Agent, or Firm*—Raymond L. Owens

(57) ABSTRACT

A process laminates a flexible electrically addressable display and includes steps of: providing a flexible, electrically addressable liquid crystal display having two surfaces, placing a protective sheet over one of the surfaces, and heating and pressing the protective sheet to adhere it to the surface. The display has a flexible substrate on which is formed a transparent, first electrically conductive layer. A light modulating layer having liquid crystalline material and a polymeric binder is disposed on the electrically conductive layer, and a patterned layer having areas of opaque electrically conductive material is formed on the light modulating layer. A dielectric layer has apertures to the areas of opaque electrically conductive material and to the first electrically conductive layer is disposed on the patterned layer, and a second electrically conductive layer overlying the dielectric layer extends into the contact apertures to the areas of opaque electrically conductive material and the first electrically conductive layer.

14 Claims, 1 Drawing Sheet

PROCESS FOR LAMINATING ELECTRICALLY ADDRESSABLE DISPLAY

CROSS REFERENCE TO RELATED APPLICATION

Reference is made to commonly-assigned U.S. patent application Ser. No. 09/628,082 filed concurrently herewith, entitled "Selective Removal of Light Modulating Layer From Electrically Conductive Layer of Liquid Crystal Display Structure" by Dwight J. Petruchik, the disclosure of which is incorporated herein.

FIELD OF THE INVENTION

The present invention relates to electrically addressable displays and, more particularly, to a process for laminating a flexible electrically addressable display material to produce an image display of high strength and good durability.

BACKGROUND OF THE INVENTION

Liquid crystalline materials, because they can be manipulated between light scattering and light transmissive modes in response to applied electric fields, find use in a variety of display devices. These materials, which may have either positive or negative dielectric anisotropy, are generally classified as nematic or smectic. A particular type of nematic liquid crystals, referred to as chiral nematic, has the ability to selectively reflect one component of circularly polarized light. In the chiral nematic phase, which is synonymous with the cholesteric phase, chiral molecules form very thin layers of aligned molecules, the alignment in one layer being at a slight angle from that in an adjacent layer, and the alignment in a stack of such layers forming a continuous helical pattern.

Many known liquid crystal display devices make use of liquid crystalline materials dispersed in polymeric matrices. For example, U.S. Pat. No. 4,435,047, the disclosure of which is incorporated herein by reference, describes a liquid crystalline material, preferably nematic, of positive dielectric anisotropy dispersed in a polymeric encapsulating medium such as polyvinyl alcohol. Also, U.S. Pat. No. 4,685,771, the disclosure of which is incorporated herein by reference, describes a light-modulating liquid crystal display material that contains liquid crystalline microdroplets dispersed in a thermoplastic resin, the microdroplets being of a size effective to scatter incident light when the optical axes of the microdroplets are randomly aligned. U.S. Pat. No. 5,116,528, the disclosure of which is incorporated herein by reference, describes a light modulating material that includes a liquid crystalline material dispersed in a cross-linked isocyanate material, preferably a polyacrylic urethane. Also, U.S. Pat. No. 5,583,670, the disclosure of which is incorporated herein by reference, describes an information recording layer in which a liquid crystal phase is dispersed in an acrylic or methacrylic resin having a molecular weight of 25,000 to 100,000.

PCT/WTO 97/04398, entitled ELECTRONIC BOOK WITH MULTIPLE DISPLAY IMAGES, discloses the assembly of multiple electronically written display sheets into a "book." The reference describes prior art techniques for forming thin, electronically written pages, including flexible sheets, image modulating material formed from a bi-stable liquid crystal system, thin metallic conductor lines on each page, and transparent conducting polymers formed over the light modulating material.

Co-pending, commonly assigned U.S. application Ser. No. 09/379,776, filed Aug. 24, 1999 for FORMING A DISPLAY HAVING CONDUCTIVE IMAGE AREAS OVER A LIGHT MODULATING LAYER, the disclosure of which is incorporated herein by reference, describes a method for forming a display on a transparent substrate on which is formed a transparent, electrically conductive coating. A light modulating layer including liquid crystal material in a polymer binder is formed over the electrically conductive layer, and an opaque conductive material is deposited in an imagewise pattern over the light modulating layer in the form of viewable and conductive images. The light modulating layer is effective in a first condition to prevent the viewing of the viewable and conductive images and in a second condition to permit the viewing of the viewable and conductive images. Electrical connections enable an electrical field to be applied across selected ones of the viewable and conductive images and the transparent electrically conductive layer to cause the light modulating layer underlying the selected images to change from the first condition to the second condition and thereby present the images for viewing by a viewer.

There is a need for incorporating electrically addressable displays, in particular, those formed on a thin, flexible substrate, into a wide variety of durable devices, for example, credit cards, telephone cards, signs, clocks, advertising devices, and the like. Such display devices must be able to withstand or mitigate damage caused by, for example, abrasion, impact, and various environmental factors.

SUMMARY OF THE INVENTION

The present invention is directed to a process for laminating a flexible electrically addressable display that comprises: providing a flexible, electrically addressable liquid crystal display having first and second surfaces, placing a protective sheet over at least one of the first and second surfaces, and subjecting the protective sheet to conditions of temperature and pressure effective to cause the protective sheet to adhere to the surface, thereby forming a laminate that comprises the electrically addressable liquid crystal display.

Further, an electrically addressable liquid crystal display made in accordance with the present invention includes a laminate which comprises a flexible substrate on which is formed a transparent, first electrically conductive layer. A light modulating layer comprising liquid crystalline material and a polymeric binder is disposed on the electrically conductive layer, and a patterned layer comprising areas of opaque electrically conductive material is formed on the light modulating layer. A dielectric layer that comprises contact apertures to the areas of opaque electrically conductive material and to the first electrically conductive layer is disposed on the patterned layer, and a second electrically conductive layer overlying the dielectric layer extends into the contact apertures to the areas of opaque electrically conductive material and the first electrically conductive layer.

The laminate enables displays to withstand damage caused by abrasion, impact and various environmental factors.

DETAILED DESCRIPTION OF THE INVENTION

Figure 1A:
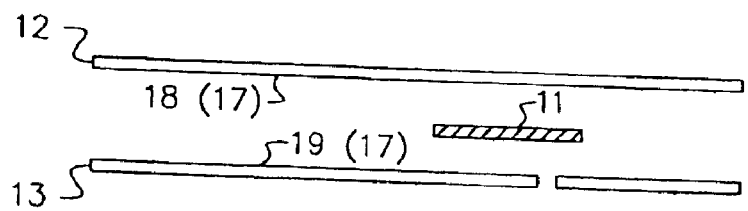
FIGS. 1A and 1B schematically depict the process of the present invention for laminating an electrically addressable liquid crystal display between two protective sheets.
Figure 1B:
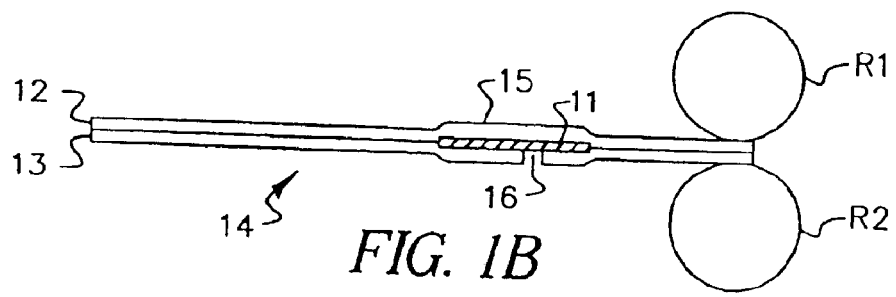

As illustrated in FIGS. 1A and 1B, an electrically addressable liquid crystal display 11 is placed between protective sheets 12 and 13, and the resulting assembly is passed between two heated laminating rollers R1 and R2 to form a laminate 14 that includes display 11, which is viewable through display window 15. Protective sheet 13 includes a contact aperture 16 to enable electrical contact with display 11. If display 11 includes a durable substrate, as described in the discussion of FIG. 3 below, protective sheet 12, which would be in contact with that substrate, may be omitted.

Laminating rollers R1 and R2 provide sufficient heat and pressure to cause protective sheets 12 and 13 to adhere to each other and to display 11 to form laminate 14. Heating is preferably carried out at a temperature of about 25EC to about 150EC, together with an applied pressure of about 1 kg/cm² to about 5 kg/cm². An adhesive resin 17, which may be either a homopolymer or co-polymer adhesive resin, is preferably applied to one or both of inner surfaces 18 and 19 of sheets 12 and 13, respectively, to ensure strong lamination.

Protective sheets 12 and 13 may be formed from various materials, for example, polyesters, polyolefins, polycarbonates, vinyl resins, acrylic resins, and methacrylic resins.

Figure 2A:
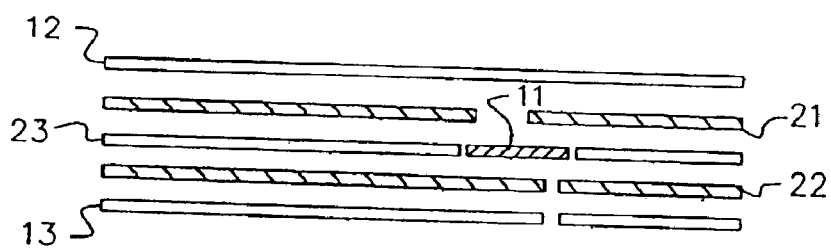
FIGS. 2A and 2B depict a further embodiment of the process of the invention in which the laminate further includes printed sheets.
Figure 2B:
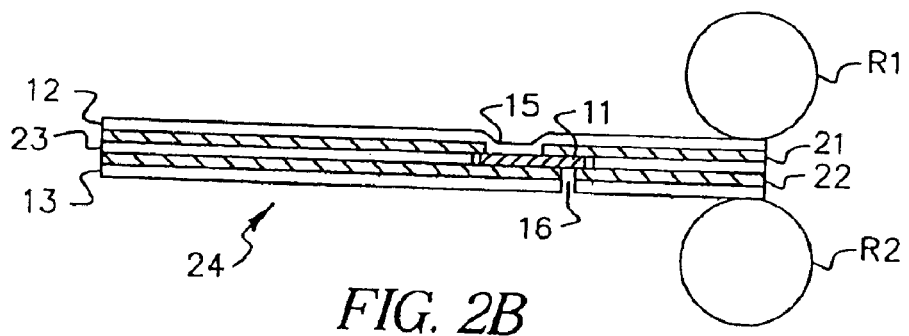

FIGS. 2A and 2B depict a process similar to that of FIGS. 1A and 1B, except a printed sheet 21 is inserted between protective sheet 12 and display 11. Optionally, a second printed sheet 22 may be inserted between protective sheet 13 and display 11. A spacer 23 may also be insert between printed sheets 21 and 22 to form a laminate 24.

Depending on the intended application of laminate 24 as, for example, a bank credit or debit card, a telephone card, a sign, a clock, or an advertising display, printed sheets 21 and 22 may include text, illustrations, or logos.

Figure 3:
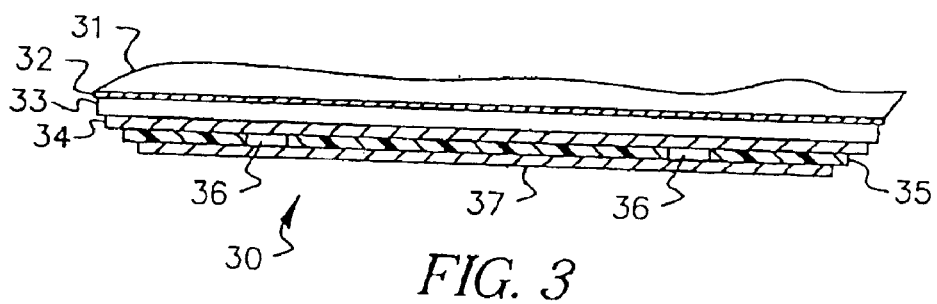
FIG. 3 is a schematic cross-sectional view of an electrically addressable liquid crystal display useful in the practice of the present invention.

FIG. 3 is a cross-sectional view of an electrically addressable liquid crystal display 30 that can be beneficially employed as display 11 in the above-described laminates 14 and 24. Liquid crystal display 30, which is described in the previously cited U.S. application Ser. No. 09/379,776, filed Aug. 24, 1999 for FORMING A DISPLAY HAVING CONDUCTIVE IMAGE AREAS OVER A LIGHT MODULATING LAYER, includes a flexible substrate 31, preferably comprising polyester, and a transparent, first electrically conductive layer 32, preferably of indium-tin oxide (ITO), disposed on substrate 31.

A light modulating layer 33 comprising liquid crystalline material, preferably a cholesteric material, and a polymeric binder, preferably deionized gelatin, is disposed on electrically conductive layer 32. A patterned layer comprising areas 34 of opaque electrically conductive material is disposed on light modulating layer 33. The opaque material in areas 34 preferably comprises electrically conductive ink, which can be applied by various printing techniques, for example, screen, ink jet, or offset printing.

A dielectric layer 35 disposed on the patterned layer comprising areas 34 contact apertures 36 to areas 34 of opaque electrically conductive material and to first electrically conductive layer 32. (The aperture to conductive layer 32 is not shown.) A second electrically conductive layer 37 overlies dielectric layer 35 and extends into contact apertures 36 to areas 34 of opaque electrically conductive material and to first electrically conductive layer 32.

The invention has been described in detail for the purpose of illustration, but it is to be understood that such detail is solely for that purpose, and various can be made by those skilled in the art without departing from the spirit and scope of the invention, which is defined by the following claims.

PARTS LIST

R1 laminating roller
R2 laminating roller
11 liquid crystal display
12 protective sheet
13 protective sheet
14 laminate
17 adhesive resin
18 inner surface
19 inner surface
21 printed sheet
22 printed sheet
23 spacer
24 laminate
30 display
31 substrate
32 electrically conductive layer
33 light modulating layer
34 areas
35 dielectric layer
36 apertures
37 electrically conductive layer

What is claimed is:

1. A process for laminating a flexible electrically addressable display, said process comprising:

providing a flexible electrically addressable liquid crystal display having first and second surfaces;

placing a protective sheet over at least one of said first and second surfaces; and subjecting said protective sheet to conditions of temperature and pressure effective to cause said protective sheet to adhere to said surface, thereby forming a laminate comprising said electrically addressable liquid crystal display wherein said flexible, electrically addressable liquid crystal display comprises:

a flexible substrate;

a transparent, first electrically conductive layer disposed on said substrate;

a light modulating layer comprising liquid crystalline material and a polymeric binder disposed on said electrically conductive layer;

a patterned layer comprising areas of opaque electrically conductive material disposed on said light modulating layer;

a dielectric layer disposed on said patterned layer, said dielectric layer comprising contact apertures to said areas of opaque electrically conductive material and to said first electrically conductive layer; and a second electrically conductive layer overlying said dielectric layer and extending into said contact apertures to said areas of opaque electrically conductive material and to said first electrically conductive layer.

2. The process of claim 1 further comprising:
   providing an adhesive resin between said protective sheet and said surface prior to said applying heat and pressure.

3. The process of claim 2 wherein said adhesive resin is selected from the group consisting of homopolymer and co-polymer adhesive resins.

4. The process of claim 1 wherein said substrate comprises polyester and said first electrically conductive layer comprises indium-tin oxide (ITO).

5. The process of claim 1 wherein said liquid crystalline material comprises cholesteric material and said polymeric binder comprises deionized gelatin.

6. The process of claim 1 wherein said areas of opaque electrically conductive material comprise electrically conductive ink.

7. The process of claim 1 wherein said protective sheet is formed of a material selected from a group consisting of polyesters, polyolefins, polycarbonates, vinyl resins, acrylic resins, and methacrylic resins.

8. The process of claim 1 wherein said step of subjecting the protective sheet to conditions of temperature includes applying heat is at a temperature of about 25° C. to about 150° C. and said applying pressure is at a pressure of about 1 kg/cm$^2$ to about 5 kg/cm$^2$.

9. The process of claim 1 further comprising: inserting a first printed sheet between said first surface and a first protective sheet.

10. The process of claim 9 further comprising:
    inserting a second printed sheet between said second surface and a second protective sheet.

11. The process of claim 1 wherein at least one protective sheet comprises a contact aperture to said electrically addressable liquid crystal display.

12. A laminated electrically addressable liquid crystal display formed by the process of claim 1.

13. A process for laminating a flexible electrically addressable display, said process comprising:
    providing a flexible, electrically addressable liquid crystal display having first and second surfaces and comprising:
        a transparent, first electrically conductive layer disposed on said substrate;
        a light modulating layer comprising liquid crystalline material and a polymeric binder disposed on said electrically conductive layer;
        a patterned layer comprising areas of opaque electrically conductive material disposed on said light modulating layer;
        a dielectric layer disposed on said patterned layer, said dielectric layer comprising contact apertures to said areas of opaque electrically conductive material and to said first electrically conductive layer; and
        a second electrically conductive layer overlying said dielectric layer and extending into said contact apertures to said areas of opaque electrically conductive material and to said first electrically conductive layer;
    placing a protective sheet over each of said first and second surfaces of said electrically addressable liquid crystal display; and
    subjecting said protective sheets to conditions of temperature and pressure effective to cause said protective sheets to adhere to said first and second surfaces, thereby forming a laminate comprising said electrically addressable liquid crystal display.

14. The process of claim 13 wherein said substrate and said protective sheets comprise polyester, said first electrically conductive layer comprises indium-tin oxide (ITO), said liquid crystalline material comprises a cholesteric material, said polymeric binder comprises deionized gelatin, and said areas of opaque electrically conductive material comprise electrically conductive ink.

* * * * *